April 7, 1942.   G. S. RALSTON   2,278,488
WATER TREATING APPARATUS
Filed July 29, 1937
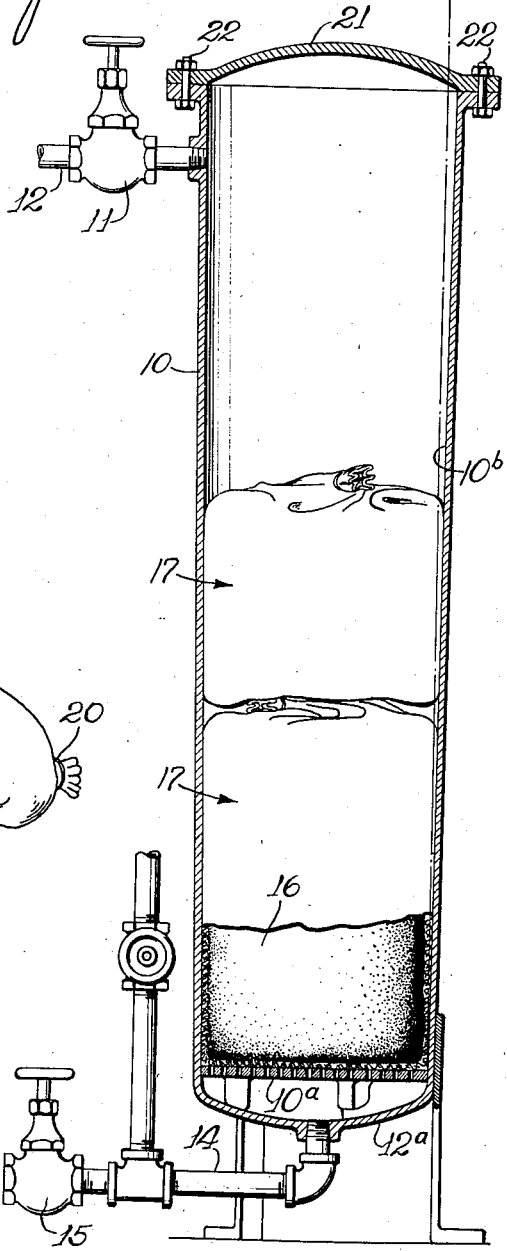
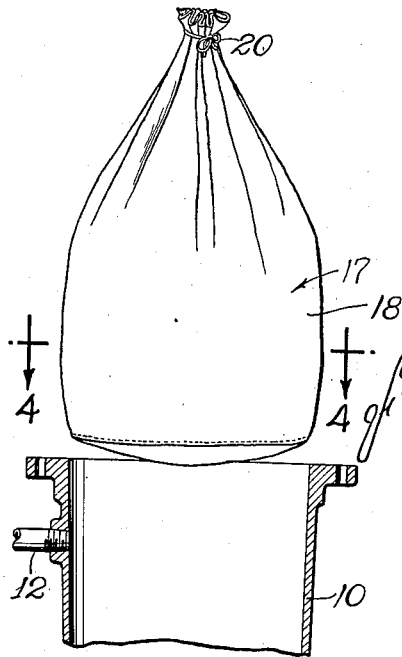
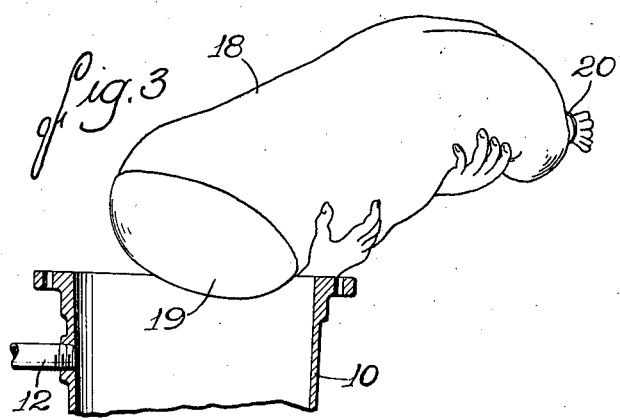
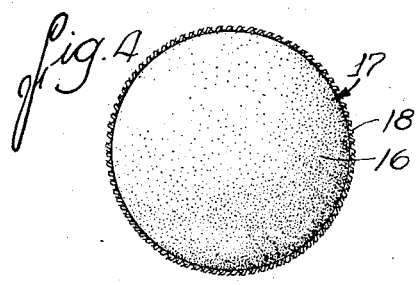
INVENTOR
Glenn S. Ralston
By Parker, Carlson, Pitzner & Hubbard
ATTORNEYS Patented Apr. 7, 1942

2,278,488

UNITED STATES PATENT OFFICE 2,278,488

WATER TREATING APPARATUS

Glenn S. Ralston, Rockford, Ill., assignor to Servisoft, Inc., Rockford, Ill., a corporation of Illinois Application July 29, 1937, Serial No. 156,276

4 Claims. (Cl. 210—24)

The invention relates to apparatus for treating water as, for example, by flowing water through a bed of softening or purifying mineral.

In general, the apparatus herein disclosed constitutes an improvement on that described and claimed in Patent No. 2,087,157. Said apparatus embodies in general an upright cylindrical tank through which water flows from end to end having removable water pervious cartridges or sacks of granular mineral therein, the sacks being flexible and of sufficiently large cross section as to expand automatically under the weight of the mineral into sealing engagement with the interior tank walls. The cartridges of mineral are periodically removed for purposes of regeneration or replacement.

The general object of the present invention is to provide, in an apparatus of the character set forth, a novel construction of the tank and cartridges by which the latter may be removed easily and quickly from the tank preparatory to replacement thereof and by which frictional wear and strain on the cartridges in service use are reduced to a minimum. This improved result is preferably attained by tapering the interior of the tank longitudinally so that the seal between the tank and the cartridge will be broken upon a slight movement of the cartridge toward the open end of the tank.

Other objects and advantages of the invention will become apparent from the following detailed description taken in connection with the accompanying drawing, in which Figure 1 is a vertical sectional view of a water treating apparatus embodying the present invention.

Fig. 2 is an elevational view of one of the mineral cartridges after removal thereof from the treating tank, the upper portion of which is shown in vertical section.

Fig. 3 is a similar view illustrating the manner of shaping the cartridge preparatory to its insertion in the tank.

Fig. 4 is a transverse sectional view taken along the line 4—4 of Fig. 2.

For purposes of illustration, the invention has been shown and described herein as embodied in an apparatus particularly adapted for softening the water of a domestic water supply system, but it will be understood that the invention is applicable in its broader aspects to various other types of water treating or purifying apparatus. The installation illustrated includes a tank 10 which is elongated and arranged in upright or vertical position. Near its upper end the tank is connected through a valve 11 and pipe 12 to a source of water to be treated. The tank is closed at its lower end by a bottom wall 12$^a$ and has an outlet pipe 14 leading through a valve 15 to the pipes through which the treated water is to be delivered. The treating tank may be drained by opening the valve 15.

The water passing through the tank 10 is softened or otherwise treated by flowing through granular minerals 16 contained in removable water pervious cartridges designated generally by the numeral 17. The zeolite or other softening mineral contained in the cartridges requires periodic regeneration and for this reason it is desirable that the cartridges 17 be readily removable so that they may be replaced by similar cartridges and the used cartridges regenerated. Each of the cartridges comprises a sack of strong yet relatively flexible fabric. This sack fabric is sufficiently thin and coarse to permit the ready flow of water therethrough, but is sufficiently fine to retain properly the granulated zeolite mineral of ordinary fineness. As illustrated, the sacks include a generally cylindrical body portion 18 and a separately formed circular bottom piece 19 sewed to one end of the body. The other end is gathered together and closed in any desired manner as, for example, by cord 20. The sack is preferably only partially filled with mineral which may be distributed longitudinally of the sack as shown in Fig. 3 so as to facilitate insertion of the cartridge into the tank.

The upper end is opened to its full cross section to provide an opening through which the cartridges 17 may be readily inserted and removed. This opening is closed by a removable cover 21 secured in position by bolts 22.

The cross sectional shape of the sack corresponds generally to the cross sectional shape of the tank and the dimensions of the tank and sack are so correlated that the cross section of the sack, when expanded by the weight of the mineral and unconfined by the walls of the tank, are somewhat greater than the internal cross section of the tank (Fig. 2). Thus when the cartridges or sacks are positioned in the tank as shown in Fig. 1, resting on the usual perforated bottom plate 10$^a$, the weight of the mineral will cause the sacks to be expanded into liquid sealing engagement with the tank walls substantially throughout the length of the bed formed by the mineral in each sack.

In order to facilitate the removal of the cartridges from the treating tank preparatory to replacement of the cartridges, the tank and cartridges are preferably so dimensioned that the effective seal between the cartridge and the tank will be broken and friction on the cartridge relieved by a slight upward movement of the cartridge. To this end, the internal wall 10$^b$ of the tank is tapered longitudinally throughout the range of engagement with the cartridge and converges downwardly from the open end of the tank as indicated by the dot-dash line in Fig. 1. Such tapering may be effected by rolling a metal sheet of the proper dimensions into the frusto conical shape and welding the edges of the sheet together to form a seam extending longitudinally of the tank.

Preferably, the degree of taper is such as to permit the use of sacks having a cylindrical peripheral wall without detracting from the effective automatic sealing action obtained in the manner above described. A taper of one inch in thirty-six has been found to give best results and it is preferred that the taper shall not exceed two inches in thirty-six.

With the tank thus constructed, the cartridge will, when inserted in the manner illustrated in Fig. 3, expand against the tank wall under the weight of the mineral and assume the shape of an inverted truncated cone. An effective seal is thus formed throughout the length of the mineral bed within the cartridge. Owing to the assumed conical shape of the cartridge and the taper of the tank, the wall of the cartridge will, by application of a lifting force to the handle of the cartridge and a slight upward movement of the latter, be moved out of engagement with the tank wall. Friction on the sack is thus relieved and the seal destroyed so that the sack may then be lifted easily out of the tank, the water disposed above the cartridge flowing down between the tank and the cartridge. As a result, the operation of removing a cartridge is much less laborious and the necessity of previously draining the water out of the tank so as to avoid overflowing thereof from the top of the tank is obviated. In addition to saving time and labor, frictional wear on the sacks is reduced to a minimum.

I claim as my invention:

1. A water treating apparatus comprising, in combination, an elongated upright tank adapted to be connected in a water supply line for the flow of water therethrough from end to end and having an opening at its upper end for exposing the tank substantially to its full internal cross-section at the upper end thereof, said tank having a smooth interior wall defining an elongated chamber tapering outwardly toward said opening, a removable cover for closing said opening, and a removable cartridge in said tank chamber comprising a sack containing granular water treating mineral and composed of flexible material with water pervious ends and an effective cross-sectional area greater than the internal cross-section of said tank so as to expand automatically under the weight of said mineral into liquid sealing engagement with the internal walls, said mineral partially filling said sack whereby to permit of reduction in the cross-section of the cartridge for insertion and removal thereof in said tank, said tapered shape of said tank permitting ready removal of said sack upon applying a lifting force thereto.

2. A water treating apparatus comprising, in combination, an elongated upright tank adapted to be connected in a water supply line for the flow of water therethrough from end to end and having an opening at its upper end for exposing the tank substantially to its full internal cross-section at the upper end thereof, said tank having a smooth interior wall defining an elongated chamber in the form of an inverted truncated cone with a longitudinal taper not exceeding two inches for each three feet of length, a removable cover for closing said opening and a removable cartridge in said tank chamber comprising a cylindrical sack containing granular water treating mineral and composed of flexible material with water pervious ends and an effective diameter greater than the internal diameter of said tank so as to expand automatically under the weight of said mineral into liquid sealing engagement with the internal walls, said truncated cone shape of said tank chamber permitting ready removal of said sack upon applying a lifting force thereto to reduce the cross-section thereof and thereby break said sealing engagement.

3. Water treating apparatus comprising, in combination, an elongated tank of generally circular cross-section adapted to be connected in a water supply line for the flow of water thereto from end to end, said tank being open at one end and having an internal wall tapering longitudinally and diverging toward said open end, and a water pervious cartridge containing water treating material and adapted to be inserted through the open end of said tank, said cartridge having a cylindrical flexible peripheral wall adapted to expand into engagement with said tank wall whereby to form an effective seal substantially throughout the length of the bed of water treating material, the taper of said wall facilitating breaking of said seal and bodily removal of the cartridge from the tank.

4. Water treating apparatus comprising, in combination, an elongated tank open at one end and adapted to be connected in a water supply line for the flow of water thereto from end to end, the internal wall of said tank tapering longitudinally and diverging toward said open end, and a water pervious cartridge of water treating material adapted to be inserted through said open end and having a flexible peripheral wall adapted to expand against said tank wall whereby to form an effective seal which is broken readily upon slight movement of said cartridge toward said open end.

GLENN S. RALSTON.